United States Patent
Kuramori et al.

(10) Patent No.: US 6,863,102 B2
(45) Date of Patent: Mar. 8, 2005

(54) TIRE/WHEEL ASSEMBLY AND RUN-FLAT SUPPORT MEMBER

(75) Inventors: Akira Kuramori, Hiratsuka (JP);
Atsushi Tanno, Hiratsuka (JP);
Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/601,540

(22) Filed: Jun. 24, 2003

(65) Prior Publication Data
US 2004/0003880 A1 Jan. 8, 2004

(30) Foreign Application Priority Data
Jul. 5, 2002 (JP) .................................. 2002-197631

(51) Int. Cl.[7] .............................................. B60C 17/06
(52) U.S. Cl. ........................................ 152/400; 152/520
(58) Field of Search .......................... 152/379.3, 400, 152/516, 520

(56) References Cited

U.S. PATENT DOCUMENTS

| 4,183,388 A | * | 1/1980 | Cassidy | 152/158 |
| 4,193,436 A | * | 3/1980 | Cataldo | 152/158 |
| 4,295,509 A | * | 10/1981 | Stein | 152/158 |
| 4,953,291 A | * | 9/1990 | Markow | 29/894.351 |
| 5,505,241 A | * | 4/1996 | Oks | 152/158 |
| 5,634,506 A | * | 6/1997 | Augier | 152/379.5 |
| 6,463,974 B1 | * | 10/2002 | Hellweg et al. | 152/400 |
| 6,463,976 B1 | * | 10/2002 | Glinz et al. | 152/520 |

FOREIGN PATENT DOCUMENTS

| JP | 10-297226 A1 | 11/1998 |
| JP | 2001-163020 A1 | 6/2001 |
| JP | 2001-519279 A1 | 10/2001 |

* cited by examiner

Primary Examiner—Russell D. Stormer
(74) Attorney, Agent, or Firm—Rader, Fishman & Grauer PLLC

(57) ABSTRACT

A tire/wheel assembly in which a run-flat support member is inserted into a cavity of a pneumatic tire, the run-flat support member including a circular shell in which the outer circumferential side thereof is used as a support surface and the inner circumferential side thereof is opened to have two leg portions, and elastic rings supporting the ends of the two leg portions on a rim. Protruding portions are provided, respectively projecting sideways on both sides of the circular shell, and the protruding portions come to contact with an inner surface of a bead of the pneumatic tire during run-flat traveling.

9 Claims, 1 Drawing Sheet

TIRE/WHEEL ASSEMBLY AND RUN-FLAT SUPPORT MEMBER

BACKGROUND OF THE INVENTION

The present invention relates to a tire/wheel assembly and a run-flat support member, and more specifically to a tire/wheel assembly and a run-flat support member which enable an improvement of driving stability during run-flat traveling and a lightweight elastic ring.

In response to demands from the market, there have been many technologies proposed to allow a vehicle to run urgently for several hundreds of kilometers even when a pneumatic tire is punctured while the vehicle is running. Among these many proposals, technologies proposed in Japanese Patent Laid-Open Publication No. 10-297226 and Published Japanese Translation of a PCT Application No. 2001-519279 enable run-flat traveling by fitting a core onto a rim in the inner side of a cavity of a pneumatic tire that is assembled to the rim, and by supporting the punctured tire using the core.

The foregoing run-flat core (support member) includes a circular shell in which the outer circumferential side thereof serves as a support surface and the inner circumferential side thereof is opened so as to form two leg portions. Also, elastic rings are fitted to both leg portions of the circular shell, thus the run-flat core is supported on the rim through the elastic rings. By using this run-flat core, a conventional wheel and rim can be used as they are without any particular modifications. Therefore, the run-flat core is advantageously adopted without causing confusion in the market.

The elastic ring of the foregoing run-flat core is made of high hardness rubber that supports the weight of a vehicle body. However, the high hardness rubber is not capable of supporting the weight in a lateral direction sufficiently during run-flat traveling. Therefore, there has been a problem that driving stability cannot be improved enough. In addition, because the elastic rings support the weight of the vehicle body, it is required to design the rubber to have an enough thickness for enduring the weight, thus causing an increase in weight.

SUMMARY OF THE INVENTION

An object of the present invention is to provide a tire/wheel assembly which improves driving stability during run-flat traveling and enables lightweight elastic rings. Another object of the present invention is to provide a run-flat support member which improves driving stability during run-flat traveling and enables lightweight elastic rings.

In the tire/wheel assembly of the present invention for achieving the foregoing object, a run-flat support member is inserted into a cavity of a pneumatic tire, the run-flat support member including a circular shell in which the outer circumferential side thereof is used as a support surface and the inner circumferential side thereof is opened to have two leg portions, and elastic rings for supporting the ends of the two leg portions on the rim. This tire/wheel assembly is characterized in that the circular shell has protruding portions projecting sideways on both sides thereof respectively, and the protruding portions are made to contact with an inner surface of a bead of the pneumatic tire during run-flat traveling.

Moreover, the run-flat support member of the present invention includes a circular shell in which the outer circumferential side thereof is used as a support surface and the inner circumferential side thereof has two leg portions, and elastic rings for supporting the ends of the two leg portions on the rim, the run-flat support member being characterized in that the circular shell has protruding portions projecting sideways on both ends of the circular shell respectively, and the protruding portions are made to contact with an inner surface of a bead of the pneumatic tire during run-flat traveling.

In this way, the protruding portions are provided on both sides of the circular shell that constitutes a main part of the run-flat support member, and are also made to contact with the inner wall of the bead of the pneumatic tire during run-flat traveling. Consequently, the run-flat support member is engaged by the bead in a lateral direction, thus enhancing driving stability during cornering and lane changing. Moreover, since the run-flat support member is engaged by the bead, a load applied to the elastic rings is reduced. Therefore, it becomes possible to reduce the thickness of the elastic ring and thus reducing the weight thereof.

DESCRIPTION OF THE PREFERRED EMBODIMENTS

Figure 1:
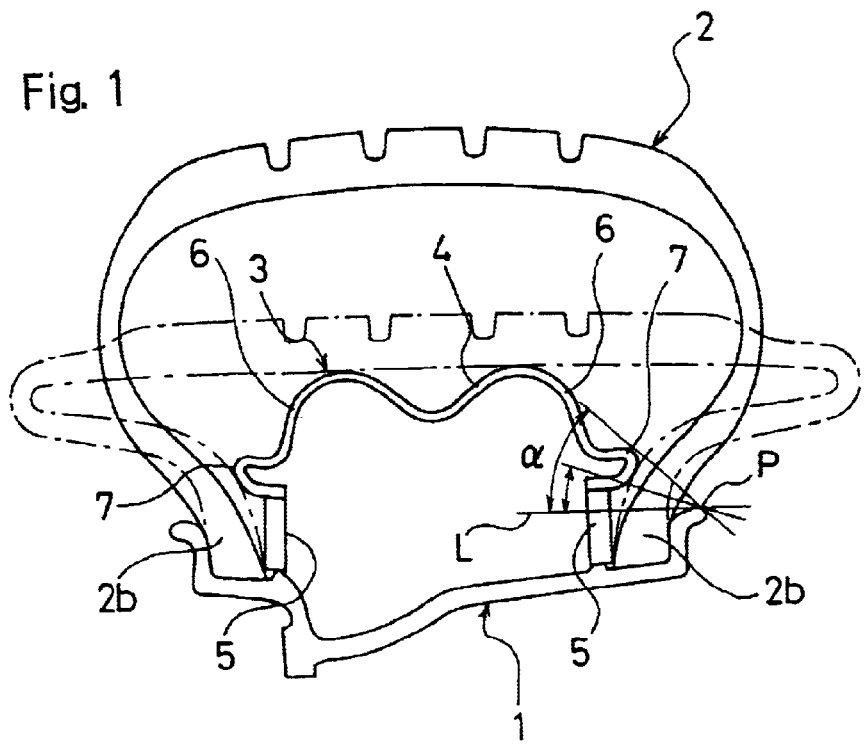
FIG. 1 is a cross-sectional view along a meridian line showing a main part of a tire/wheel assembly according to an embodiment of the present invention.

In the present invention, a run-flat support member is formed as a circular member which is inserted into a cavity of a pneumatic tire. This run-flat support member is formed to have its outer diameter smaller than the inner diameter of the cavity of the pneumatic tire in order to maintain a certain distance from the inner surface of the cavity. The inner diameter of the run-flat support member is formed to be approximately the same as the inner diameter of a bead of the pneumatic tire. Then, the run-flat support member is inserted into the inside of the pneumatic tire, and assembled to a wheel together with the pneumatic tire using through a rim, thus configuring the tire/wheel assembly. When the pneumatic tire is punctured while a vehicle with the tire/wheel assembly fitted thereto is running, the tire flattened out due to the puncture is supported on the outer circumferential surface of the run-flat support member, thus making run-flat traveling possible.

The above-described run-flat support member is constituted of the circular shell and elastic rings as main members thereof.

In the circular shell, a continuous support surface for supporting a punctured tire is formed in the outer circumferential side (outer diameter side), and the inner circumferential side (inner diameter side) is in an open shape having two leg portions serving as respective sidewalls on the right and left sides. The support surface on the outer circumferential side is formed to have a curved surface that is convex toward the outer diameter side, when viewed in the cross section profile that is orthogonal to a circumferential direction of the tire. The number of convexly curved portions on the curved surface aligned in an axial direction of the tire can be single, but preferably two or more. By forming the support surface in this way so as to align two or more convexly curved portions, contact of the support surface with the inner wall of the tire is distributed amongst two or more points. Accordingly, local wear on the inner wall of the tire can be reduced, allowing extension of an enduring distance of run-flat traveling.

The elastic rings are fitted to each end of the two leg portions provided on the inner diameter side of the circular shell, and are abutted on rim seats on the right and left sides so as to support the circular shell. Since this elastic ring is made of rubber or elastic resin, the elastic rings do not only mitigate vibration of and impact upon the circular shell, but is also slip resistant with respect to the rim seats so that the circular shell is stably supported.

Due to the fact that the run-flat support member has to support a vehicle weight through a punctured tire, the circular shell is made of a hard material. For the constituent material of the circular shell, metal or resin, etc. is used. As for the metal, for example, steel and aluminum, etc. are listed. The resin can be any of thermoplastic resin and thermosetting resin. Examples of the thermoplastic resin are nylon, polyester, polyethylene, polypropylene, polystyrene, polyphenylene sulfide and ABS. Examples of the thermosetting resin are epoxy resin and unsaturated polyester resin. The single resin can be used singly, and can also contain reinforcing fibers compounded therein to be used as fiber-reinforced resin.

A feature of the run-flat support member of the present invention is that the protruding portions projecting sideways are provided on both sides of the circular shell. Preferably, these protruding portions are provided to face the inner surface of the bead of the pneumatic tire, so that, during normal traveling, i.e., traveling without a puncture, the protruding portions and the inner surface of the bead do not contact with each other with a space intervening therebetween. The space is preferably maintained to 1 mm or more during the normal traveling. Because this non-contact state is maintained, the durability of the tire is enhanced.

The protruding portions described above can be formed by bending the sidewalls of the circular shell. Alternatively, the protruding portions can be formed by using a circular member that is independently processed from the circular shell or by fitting a plurality of block members. In the latter case using the circular member or block members, the materials of these members are not necessarily the same as that of the circular shell and thus they can be made of a different material. Moreover, the shape of the protruding portion is not limited as long as it is projecting in a width direction and its surface abuts the inner surface of the tire at the tip, as shown in the cross section (meridian cross section). Also, when viewed from the side, the protruding portion can be formed coaxially with the circular shell as a continuous circular body on the side of the circular shell. Alternatively, a plurality of blocks can be aligned with an interval therebetween to form a discontinuous circle that is coaxial with the circular shell.

A method of fitting the independently processed circular member or block members to the circular shell is not particularly limited. However, when these members and the circular shell are made of the same material and the material is metal, the members and circular shell can be fastened to each other by welding or soldering or by tightening a bolt or screw. If both materials are resin, the members and circular shell can be fastened to each other by jointing them by welding or an adhesive or by tightening a bolt or screw.

While traveling, if a vehicle with the tire/wheel assembly having the aforementioned structure comes under a run-flat traveling condition owing to a tire puncture, the circular shell is squashed in a radial direction while supporting the weight of the vehicle. Consequently, the protruding portions on the sides of the circular shell are displaced in a width direction, and then abutted against the inner walls of the bead of the pneumatic tire. When the protruding portions are abutted on the inner wall of the bead in this way, the run-flat support member is engaged by the bead in a width direction (right-and-left direction), thus improving driving stability. Further, since a load applied to the elastic rings supporting the run-flat support member is reduced, the width, etc. of the elastic rings can be reduced and therefore lightweight elastic rings are realized.

In order to further improve an operation when the protruding portions are in contact with the tire bead during run-flat traveling as mentioned above, the tip of the protruding portion contacting with the inner surface of the bead preferably has a length in a diameter direction (length along the periphery) ranging from 5 to 20 mm. If the contact length in the diameter direction is shorter than 5 mm, the effects of driving stability improvement and a lightweight elastic ring are reduced. On the other hand, if the contact length is longer than 20 mm, a problem arises that a weight of the protruding portion is increased and manufacturing thereof becomes difficult as well.

In the present invention, it is more preferable that the part of the protruding portion, which is in contact with the inner surface of the tire bead as described above, be arranged to come to the approximate vicinity of the peak of a rim flange. More specifically, suppose a straight line L passing through the peak P of the rim flange is drawn in parallel to the rotation axis of the tire, an estimated angle $\alpha$ measured from the straight line L through the bottom of the above-mentioned contact length to the top of the same using the rim flange peak P as the vertex, is within a range from 20 to 50 degrees. When the contact length above is maintained within the above range of the estimated angle $\alpha$, the effects of driving stability improvement and lightweight elastic ring can be further increased.

Hereinafter, a detailed description of the present invention will be provided based on embodiments illustrated in the drawings.

FIG. 1 is a cross-sectional view along a meridian line showing a main part of the tire/wheel assembly according to an embodiment of the present invention.

The reference number 1 denotes a rim on the circumference of a wheel, the reference number 2 denotes a pneumatic tire, and the reference number 3 denotes a run-flat support member. The rim 1, pneumatic tire 2, and run-flat support member 3 are formed in a circular shape coaxially about the rotation axis of the wheel (not shown).

The run-flat support member 3 is configured from a circular shell 4 made of a hard material such as metal or resin, and an elastic ring 5 made of an elastic material such as high hardness rubber or elastic resin. The circular shell 4 is formed to have a curved support surface with two convex portions on the circumferential side thereof, the support surface being spaced apart from the inner surface of the pneumatic tire 2 when the tire 2 is under a normal condition, and supporting the flattened tire when a puncture occurs. Further, the inner circumferential side of the circular shell 4 is opened to have two leg portions 6, 6 as sidewalls respectively, and elastic rings 5, 5 are assembled to the ends of the leg portions 6, 6.

In the circular shell 4 of the foregoing run-flat support member 3, protruding portions 7, 7 are formed at the bottom ends of the leg portions 6, 6, respectively. The protruding portions 7, 7 are formed to be integral to the circular shell 4 by bending the sidewall of the circular shell 4 outward and then folding it back inward. The protruding portions are spaced apart by 1 mm or more from the inner surface of a tire bead 2b of the pneumatic tire 2 under a condition without a puncture.

However, when the pneumatic tire 2 is punctured and a vehicle starts run-flat traveling, the tire 2 pushes the support surface of the circular shell 4, bending down the surface to a radially inner direction. The protruding portions 7, 7 on the right and left sides correspondingly abut against the inner wall of the bead 2b of the tire 2. Then, the run-flat support member 3 is engaged by the beads 2b, 2b on the right and left sides, being no longer able to move laterally. Therefore, the aforementioned tire/wheel assembly (wheel) improves driving stability during run-flat traveling. Moreover, since a load to the elastic ring 5 supporting the circular shell 4 is reduced, the rubber thickness of the elastic rings 5 can be thinned, thereby reducing the weight thereof.

In order to gain these effects, it is preferable that the tip of the protruding portion 7 which is in contact with the inner wall of the bead 2b have a length in a radial direction (length along the periphery) within a range from 5 to 20 mm, as described earlier. More preferably, the range of the estimated angle α is within 20 to 50 degrees when the angle α is measured from the rim flange peak P through the contact length, i.e., the estimated angle α being measured from the straight line L as a reference, which is drawn in parallel to the rotation axis of the tire, passing through the peak P of the rim flange.

Figure 2:
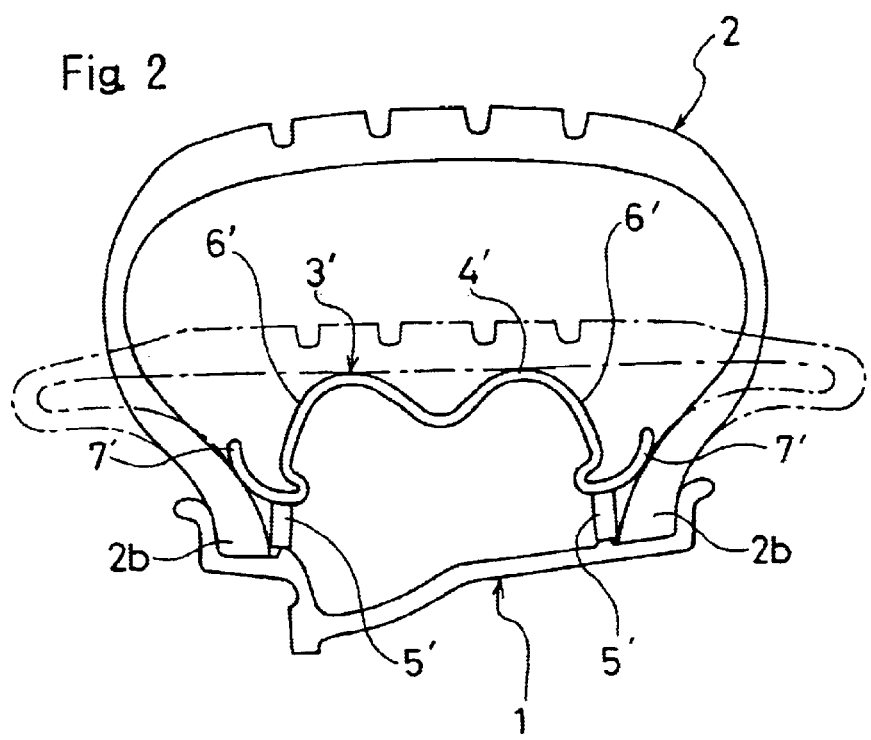
FIG. 2 is a cross-sectional view along a meridian line showing a main part of a tire/wheel assembly according to another embodiment of the present invention.

FIG. 2 is a cross-sectional view along a meridian line showing a main part of the tire/wheel assembly according to another embodiment of the present invention. As shown within FIG. 2, a run-flat support member 3' is configured from a circular shell 4' made of a hard material such as metal or resin, and an elastic ring 5' made of an elastic material such as high hardness rubber or elastic resin. The inner circumferential side of the circular shell 4' has two leg portions 6', 6' as sidewalls respectively, and elastic rings 5', 5' are assembled to the ends of the leg portions 6', 6'. In the circular shell 4' of the run-flat support member 3', protruding portions 7', 7' are formed at the bottom ends of the leg portions 6', 6', respectively.

In this embodiment, the only difference from the first embodiment is the formation of the protruding portions 7' provided on the sides of the circular shell 4'. The rest of the configuration is approximately the same as that of the first embodiment.

To be more specific, the protruding portions 7' are formed by bending the end portions of the sidewall of the circular shell 4' inward, which is then outwardly turned outward to be inverted, and then curved to be warped upward. Accordingly, the protruding portions 7' are formed as curved plates having a free end, and thus have adequate elasticity (cushioning characteristic) with respect to a load in a width direction. Hence, this type of protruding portions 7' damage the beads 2b less by contact, thus are arranged to be always in contact with the inner wall of the beads 2b when the pneumatic tire 2 is under a normal condition without a puncture.

As described heretofore, according to the present invention, the protruding portions projecting sideways are provided respectively on both sides of the circular shell that constitutes the main part of the run-flat support member. The protruding portions are adopted to contact with the inner side of the bead of the above-described pneumatic tire during run-flat traveling. Thus, the run-flat support member is engaged in a lateral direction by the bead during run-flat traveling, thereby improving driving stability. Moreover, a load applied to the elastic rings is reduced owing to engagement of the run-flat support member by the bead, realizing the thinner-walled elastic rings, whereby reducing the weight thereof.

EXAMPLE

Prepared was a tire/wheel assembly (wheel) including a pneumatic tire with a tire size of 205/55R16 89V and a wheel having a rim size of 16×6½JJ, to which a run-flat support member according to the configuration of FIG. 1 is inserted and assembled. The run-flat support member is configured from a circular shell that is made by processing a 1.0 mm-thick steel plate and has protruding portions formed on both sides thereof, and elastic rings that are made of high hardness rubber with a thickness of 12.0 mm and are assembled to the circular shell (example).

For comparison, prepared was a tire/wheel assembly (wheel) having the same configuration as that of the above-described example, except for that no protruding portions were provided in the circular shell of the run-flat support member, and that the high hardness rubber thickness of the elastic ring was changed to 15.0 mm (Conventional example).

With regard to the above two types of tire/wheel assemblies, driving stability and the weights of the elastic rings were measured using the following measurement methods, and the results shown in table 1 were obtained.

[Measurement Method for Driving Stability]

The above tire/wheel assemblies are respectively fitted to a front right wheel of a front engine/rear drive (FR) vehicle with a 2.5 liter engine. Then, the handling while turning anti-clockwise on a circular track at 90 Km/h was scored by five test drivers using a 5-point base scoring method, and evaluated based on the average value obtained from the five drivers. The evaluation value was represented by an index number, with the value of the conventional example being 100. Greater index numbers thereby represent superior driving stability.

[Measurement Method for the Elastic Rings]

The weights of the elastic rings before assembled to the respective run-flat support members were directly measured. The evaluation value was represented by an index number, with the value of the elastic ring of the conventional example being 100. Smaller index numbers thereby represent lighter elastic rubber.

TABLE 1

|  | Conventional Example | Example |
|---|---|---|
| Protruding Portion of Circular Shell | Yes | No |
| Thickness of Elastic Ring (mm) | 15.0 | 12.0 |
| Driving Stability (index number) | 100 | 117 |
| Weight of Elastic Ring (index number) | 100 | 79 |

What is claimed is:

1. A tire/wheel assembly in which a run-flat support member is inserted into a cavity of a pneumatic tire, the run-flat support member including a circular shell in which an outer circumferential side thereof is used as a support surface and an inner circumferential side thereof having two leg portions, and elastic rings supporting ends of the two leg portions on a rim, wherein protruding portions are provided, respectively projecting sideways on both sides of the circular shell, and the protruding portions come into contact with an inner surface of a bead of the pneumatic tire during run-flat traveling.

2. The tire/wheel assembly according to claim 1, wherein the protruding portions are spaced by 1 mm or more from an inner surface of a bead of the pneumatic tire during normal traveling and come into contact with the inner surface of the bead during run-flat traveling.

3. The tire/wheel assembly according to any one of claims 1 and 2, wherein the protruding portion has a contact portion with a length of 5 to 20 mm in a radial direction, the contact portion being in contact with the inner surface of the bead of the pneumatic tire during the run-flat traveling.

4. The tire/wheel assembly according to claim 3, wherein an estimated angle α is within a range from 20 to 50 degrees, the estimated angle α being measured from a straight line, which passes through a peak of a rim flange parallel to a rotation axis of the tire, through the length in a radial direction of the contract portion that is in contact with the inner surface of the bead of the pneumatic tire during the run-flat tire, using the peak of the rim flange as a vertex.

5. The tire/wheel assembly according to any one of claims 1 and 2, wherein the protruding portion is formed by bending a sidewall of the circular shell.

6. The tire/wheel assembly according to any one of claims 1 and 2, wherein the protruding portion is formed by a member independent from the circular shell.

7. A run-flat support member, comprising:
a circular shell in which an outer circumferential side thereof is used as a support surface and an inner circumferential side thereof having two leg portions; and
an elastic ring which supports ends of two leg portions on a rim,
wherein protruding portions are provided, respectively projecting sideways on both sides of the circular shell, and
the protruding portions come into contact with an inner surface of a bead of a pneumatic tire during run-flat traveling.

8. The run-flat support member according to claim 7, wherein the protruding portion is formed by bending a sidewall of the circular shell.

9. The run-flat support member according to claim 7, wherein the protruding portion is formed by a member independent from the circular shell.

* * * * *